US007984089B2

(12) United States Patent
Gates et al.

(10) Patent No.: US 7,984,089 B2
(45) Date of Patent: Jul. 19, 2011

(54) USER-DEFINED INDEXING OF MULTIMEDIA CONTENT

(75) Inventors: Matthijs A. Gates, Wellesley, MA (US);
John Bradstreet, Sammamish, WA (US); Glenn F. Evans, Kirkland, WA (US); Luke Wabaunsee McCullough, Seattle, WA (US); Rebecca C. Weiss, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 1314 days.

(21) Appl. No.: 10/778,769

(22) Filed: Feb. 13, 2004

(65) Prior Publication Data
US 2005/0193005 A1    Sep. 1, 2005

(51) Int. Cl.
G06F 12/00      (2006.01)
G06F 17/30      (2006.01)
G06F 7/00       (2006.01)
(52) U.S. Cl. .................... 707/830; 707/793; 707/796
(58) Field of Classification Search .................. 707/830, 707/793, 796
See application file for complete search history.

(56) References Cited

U.S. PATENT DOCUMENTS

| | | | |
|---|---|---|---|
| 5,268,846 A | 12/1993 | Bonsall et al. | 709/231 |
| 5,630,121 A | 5/1997 | Braden-Harder et al. | 707/102 |
| 5,655,117 A * | 8/1997 | Goldberg et al. | 1/1 |
| 6,041,345 A * | 3/2000 | Levi et al. | 709/217 |
| 6,047,280 A * | 4/2000 | Ashby et al. | 707/2 |
| 6,243,713 B1 * | 6/2001 | Nelson et al. | 707/104.1 |
| 6,385,386 B1 * | 5/2002 | Aotake | 386/68 |
| 6,415,326 B1 * | 7/2002 | Gupta et al. | 709/231 |
| 6,463,444 B1 * | 10/2002 | Jain et al. | 707/104.1 |
| 6,564,263 B1 | 5/2003 | Bergman et al. | 709/231 |
| 6,714,720 B1 * | 3/2004 | Lightstone et al. | 386/46 |
| 6,877,134 B1 * | 4/2005 | Fuller et al. | 715/202 |
| 7,302,490 B1 * | 11/2007 | Gupta et al. | 709/231 |
| 2002/0194480 A1 | 12/2002 | Nagao | |
| 2003/0120602 A1 * | 6/2003 | Jung et al. | 705/51 |
| 2003/0236792 A1 * | 12/2003 | Mangerie et al. | 707/100 |
| 2004/0021685 A1 * | 2/2004 | Denoue et al. | 345/721 |
| 2005/0071744 A1 * | 3/2005 | Dunbar et al. | 715/500.1 |

OTHER PUBLICATIONS

Interface List, Copyright 1993-2001, Sun Microsystems, Java 2 Platform St. Ed. V1.3.1, pp. 1-13.*
Pingali, Gopal S., et al.; "Instantly Indexed Multimedia Databases of Real World Events"; *IEEE Transactions on Multimedia*; Jun. 2002; vol. 4, No. 2; p. 269-82.

(Continued)

*Primary Examiner* — Kuen S Lu
*Assistant Examiner* — Hexing Liu
(74) *Attorney, Agent, or Firm* — Workman Nydegger

(57) ABSTRACT

Methods, systems, and computer program products for arbitrarily indexing multimedia content. In accordance with example embodiments, a multimedia content stream that comprises one or more samples is received. At least one of the samples is passed to one or more multimedia filters for analysis based on criteria that define an index type for the multimedia filter. Once it is determined that the sample meets the criteria for an arbitrary filter and index type, an index entry that identifies both the sample and the index type of the arbitrary filter is created. The index entry is adapted in accordance with a common, extensible indexing scheme to coexist with other index entries of other or the same index type for the sample. The created index entry is stored for subsequent access.

16 Claims, 15 Drawing Sheets

OTHER PUBLICATIONS

Hunter, Jane, et al.; "Building and Indexing a Distributed Multimedia Presentation Archive Using SMIL"; Proceedings Research and Advanced Technology for Digital Libraries 5th European Conference ECDL 2001; Sep. 4-9, 2001; Darmstadt, Germany; p. 415-28.

Adami, N., et al.; "The ToCAI Description Scheme for Indexing and Retrieval of Multimedia Documents"; *Multimedia Tools and Applications*; Jun. 2001; vol. 14, No. 2; p. 153-73.

Wilcox, Lynn; "Annotation and Segmentation for Multimedia Indexing and Retrieval"; Proceedings of the Thirty-First Hawaii International Conference on System Sciences; Jan. 6-9, 1998; Kohala Coast, HI, USA; vol. 2; p. 259-66.

Shih-Fu Chang; "Content-Based Indexing and Retrieval of Visual Information"; *IEEE Signal Processing Magazine*; Jul. 1997; vol. 14, No. 4, p. 45-8.

Luz, Saturnino; "Compact Visualization of Multimedia Interaction Records"; Proceedings Seventh International Conference on Information Visualization IV 2003—International Conference on Computer Visualization and Graphics Applications; Jul. 16-18, 2003; London, UK; p. 536-41.

Arvanitis, Loukas G., et al.; "Multiresource Inventories Incorporating GIS, GPS and Database Management Systems: A Conceptional Model"; *Computers and Electronics in Agriculture*; Aug. 2000; vol. 28, No. 2; p. 89-100.

Jasinschi, R. S., et al.; "Integrated Multimedia Processing for Topic Segmentation and Classification"; Proceedings 2001 International Conference on Image Processing; Oct. 7-10, 2001; Thessaloniki, Greece; vol. 3; p. 366-9.

\* cited by examiner

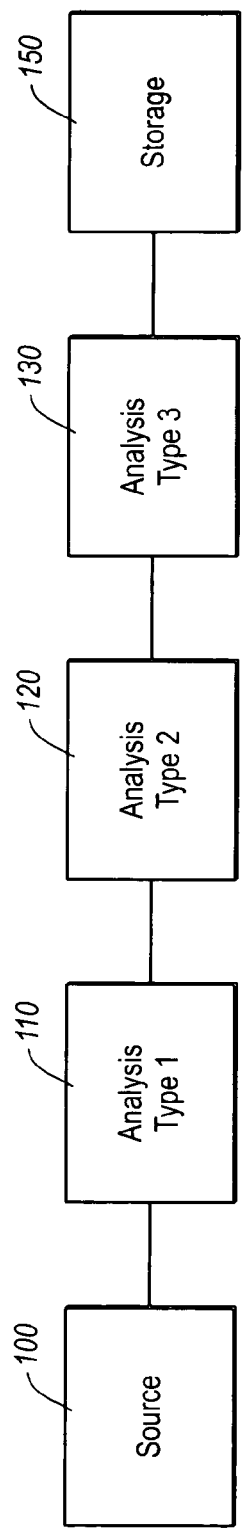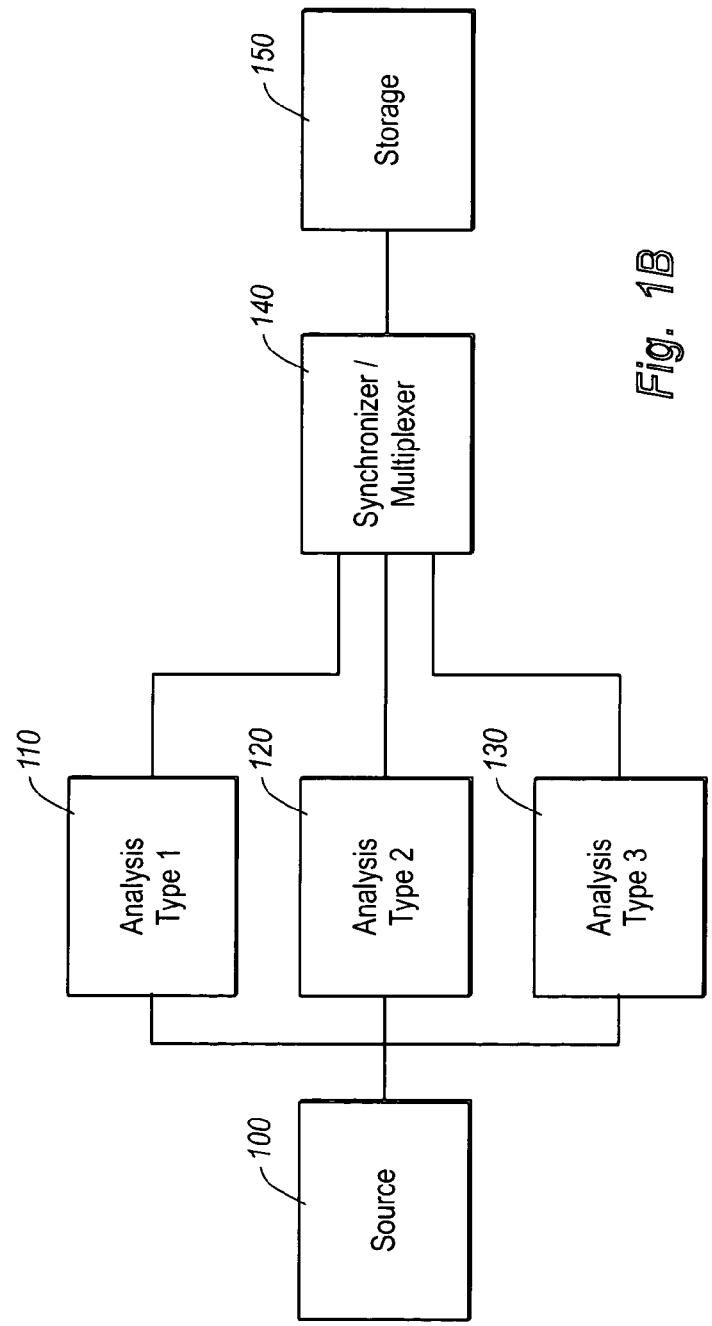

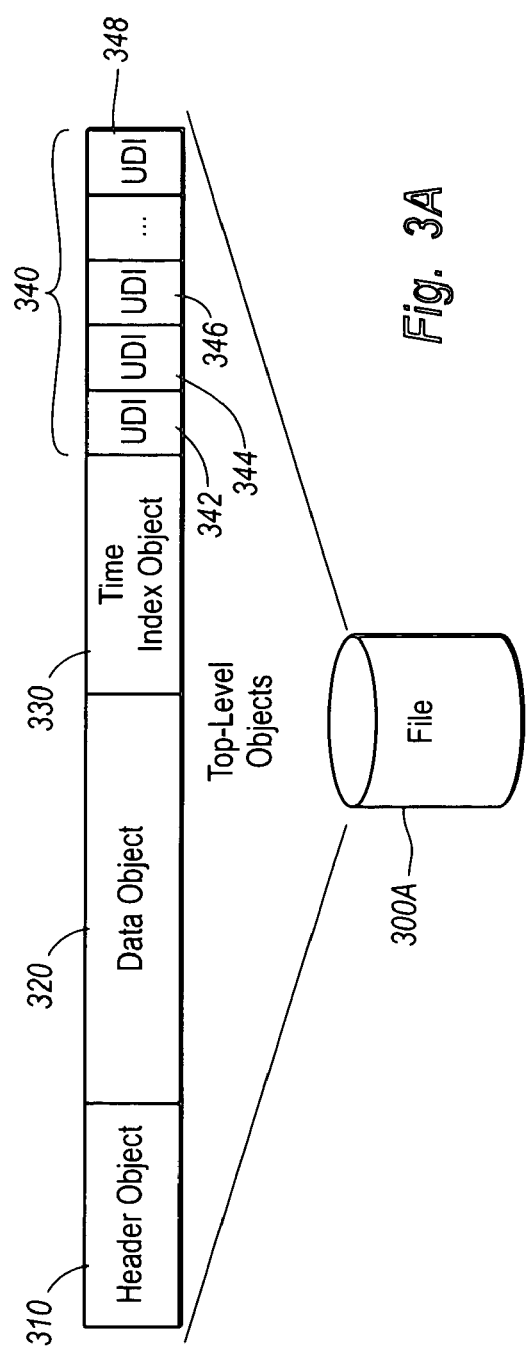
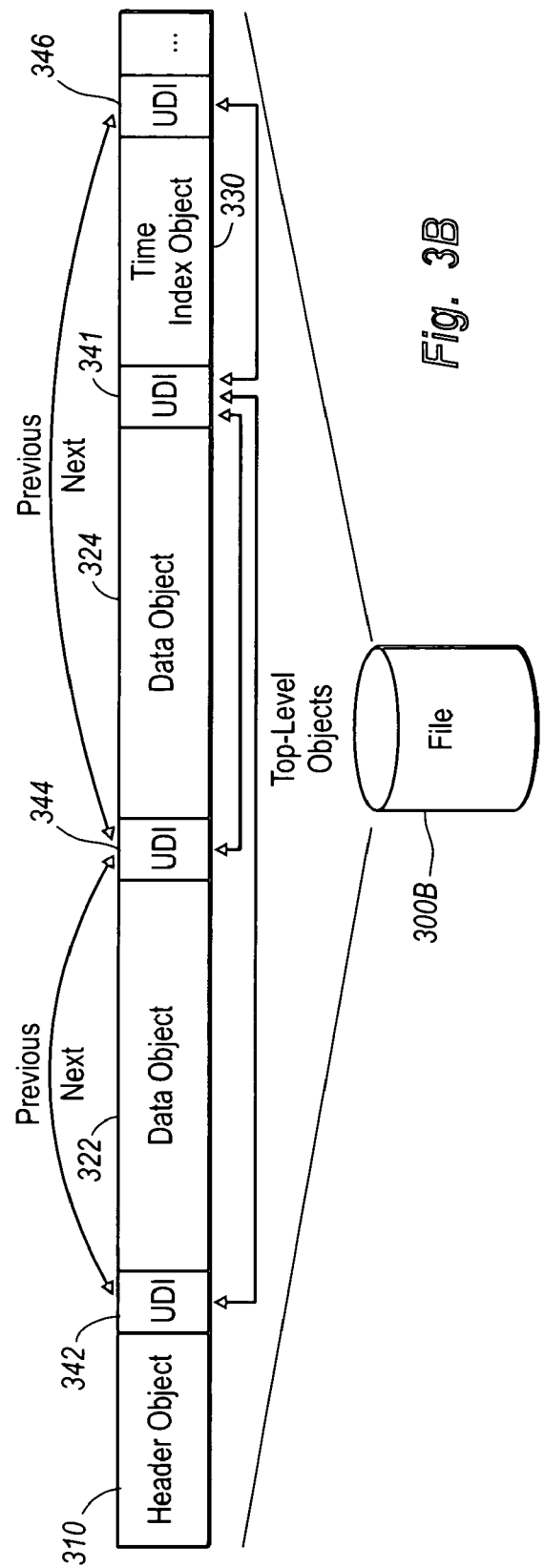

USER-DEFINED INDEXING OF MULTIMEDIA CONTENT

CROSS-REFERENCE TO RELATED APPLICATIONS

N/A

BACKGROUND OF THE INVENTION

1. The Field of the Invention

The present invention relates to indexes for multimedia content. More specifically, the present invention relates to adding an arbitrary index to multimedia content such that the arbitrary index is capable of coexisting with one or more other arbitrary indexes.

2. Background and Related Art

Traditionally, indexing of multimedia content has been either time-based or frame-based. In other words, access to multimedia content (other than sequential access) requires specifying a particular time offset (e.g., 5 minutes and 18 seconds) or specifying a particular frame offset (e.g., frame 302010). With respect to content for which compression is linear, such as audio content, time offsets essentially correspond to byte offsets within the content, and therefore the content may appear to be indexed, when in fact it is not—seeking to a particular time offset is simply a matter of seeking to the corresponding byte offset within the content. Compression for other content, such as video content, is nonlinear, and therefore seeking to a particular time offset usually requires a time index that maps either directly to a byte offset within a file or indirectly to a byte offset through a frame index that maps directly to a byte offset.

One of the problems with traditional multimedia indexes is their lack of flexibility. Generally these indexes are produced by the content author and may not be subsequently altered or extended. In some cases, the indexing also may be linked to the layout or physical storage of the multimedia content on a medium. For example, DVDs often allow for navigation by scene. This navigation, however, is based on the multimedia content being divided into chapters on the DVD (each scene is a separate chapter). As a result, it would not be possible for a consumer to alter the DVD's scene navigation, by adding, deleting, or combining scenes. Other traditional indexes are stored in a file header and therefore are limited in size. When the index needs to expand, the multimedia content must be shifted down in the file, which in this context, may be prohibitive, given that the size of multimedia data often is measured in gigabytes.

Traditional indexes also tend to be brittle. For instance, returning to the DVD example above, a content author could alter the scene navigation, but in doing so, the original navigation is no longer possible. Because the scene indexing is based on chapter divisions, it is not possible for two different scene navigations to coexist on the same medium. Of course, altering scene navigation for a DVD would not be possible for anyone other than the DVD zauthor.

Similar indexing problems arise in other multimedia contexts. For example, the increasing popularity of personal video recorders (PVRs) offers an opportunity for a number of desirable indexing scenarios. PVRs generally are used to record multimedia content that is broadcast over a cable network, a satellite network, or publicly accessible frequency bands. Examples of desirable indexes might include an index for scene changes, voice changes, commercials, MPEG video frames (I, P, and B), viewer-defined events (e.g., favorite scenes, etc.), content protection information, and so forth. Traditional multimedia indexing schemes, however, lack the ability to generate arbitrary indexes that can coexist and not interfere or collide with each other. This is particularly so, where different indexes of the same type are present (e.g., scene changes, favorite scenes, favorite scenes of different consumers or users, etc.).

Accordingly, methods, systems, and computer program products are desired for arbitrarily indexing multimedia content such that the arbitrary indexes are capable of coexisting with each other.

BRIEF SUMMARY OF THE INVENTION

The present invention relates to arbitrarily indexing multimedia content. In accordance with example embodiments, one or more multimedia content streams are received, each stream comprising one or more samples. At least one sample is passed to one or more multimedia filters for analysis based on criteria that define an index type for each filter. A determination is made that the sample meets the criteria for an arbitrary filter and index type. An index entry that identifies the sample and the index type of the arbitrary filter is created. The index entry is adapted in accordance with a common, extensible indexing scheme to coexist with other index entries of other or the same index type for the sample. The created index entry is stored for subsequent access.

The sample may have already been indexed, perhaps by the content author, with at least one other index, such as a time- or frame-based index, or a Society of Motion Picture and Television Engineers (SMPTE) timecode index. If multiple filters are present, it may be determined that the sample meets the criteria for another filter and index type. In this case, another index entry that identifies the sample and the index type of the other filter is created and stored for subsequent access. Multiple filters may be arranged in serial, in parallel, and/or a combination of serial and parallel. Index entries may be stored with the multimedia content, in a separate file, or in a temporary memory, such as an index cache. Types of filters and indexes are completely arbitrary, and may include new scenes, a user's favorite scenes, correlated external events (such a clocks, Internet pulses, instant messages, phone calls, and so forth), text criteria (such as closed captioning criteria, subtitle criteria, descriptive video criteria, and the like), voice change or other audio criteria, commercials, video frames, content protection information, etc. It should be recognized that indexes may be hierarchical (i.e., they may reference previously generated indexes to an arbitrary number of levels, which finally reference the actual content). Multimedia content should be interpreted broadly to encompass audio, video, graphics images, closed-captioning data, subtitles, Advanced Television Enhancement Forum (ATVEF) data, and the like.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIGS. 1A-1C illustrate example arrangements of multimedia content filters for adding an arbitrary index to multimedia content in accordance with the present invention;

FIGS. 3A-3C show example file formats for storing multimedia content indexes;

DETAILED DESCRIPTION OF THE PREFERRED EMBODIMENTS

The present invention extends to methods, systems, and computer program products for adding an arbitrary index to multimedia content such that the arbitrary index is capable of coexisting and not interfering with one or more other arbitrary indexes regardless of index type. The embodiments of the present invention may comprise one or more special purpose and/or one or more general purpose computers including various computer hardware, as discussed in greater detail below.

Figure 1C:
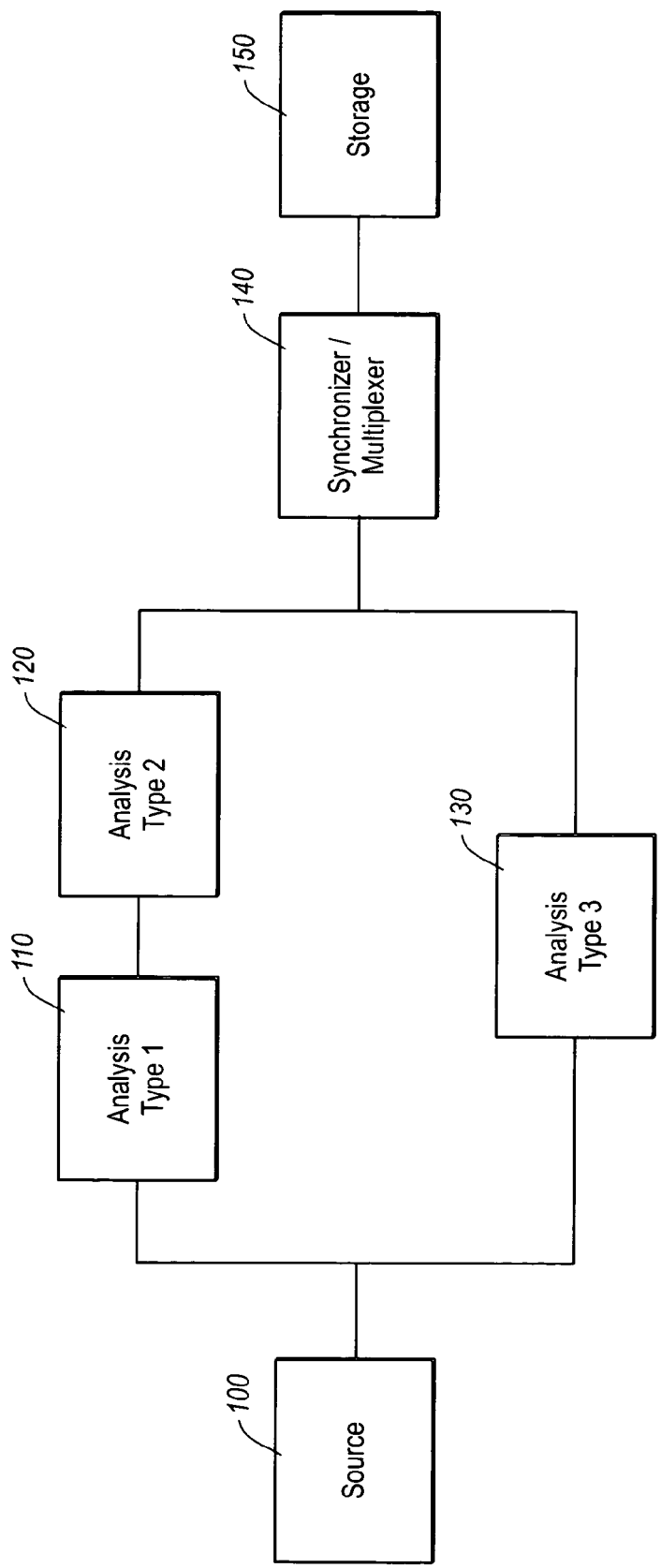

FIGS. 1A-1C illustrate example arrangements of multimedia content filters for adding an arbitrary index to multimedia content in accordance with the present invention. Each filter analyzes the multimedia content it receives from source 100 based on certain filter criteria, labeled as analysis type 1 for filter 110, analysis type 2 for filter 120, and analysis type 3 for filter 130. The type of analysis performed is completely arbitrary, but may include criteria for detecting scene changes, detecting voice changes, detecting commercials, detecting various types of video frames (i.e., I-frames, P-frames, and B-frames for an MPEG video stream), detecting content protection information, detecting closed captioning information, detecting viewer-selected or viewer-identified events, correlating external events to the multimedia content, correlating events produced by other types of analysis, etc.

Figure 2:
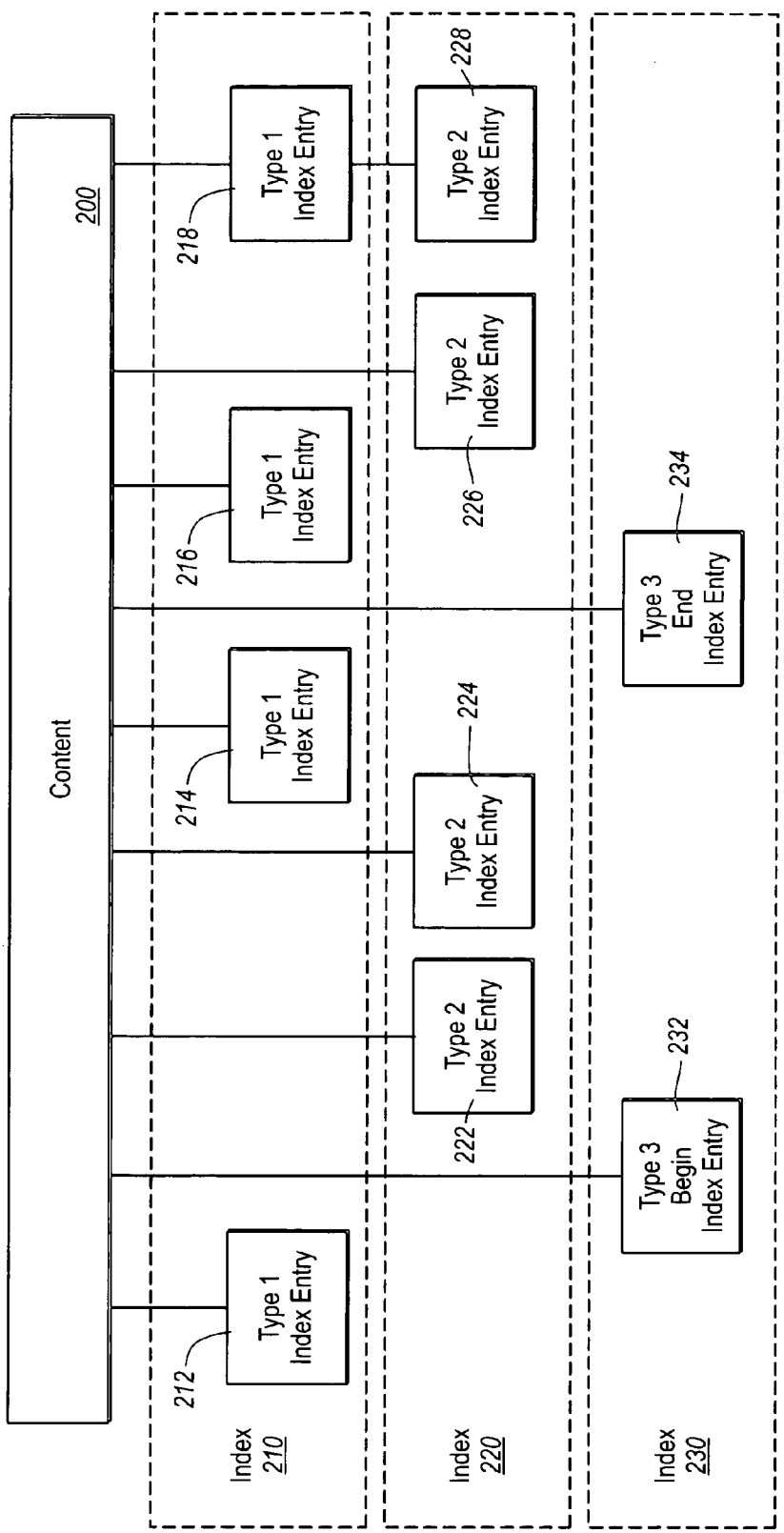
FIG. 2 shows multimedia content with example indexes.
Figure 3C:
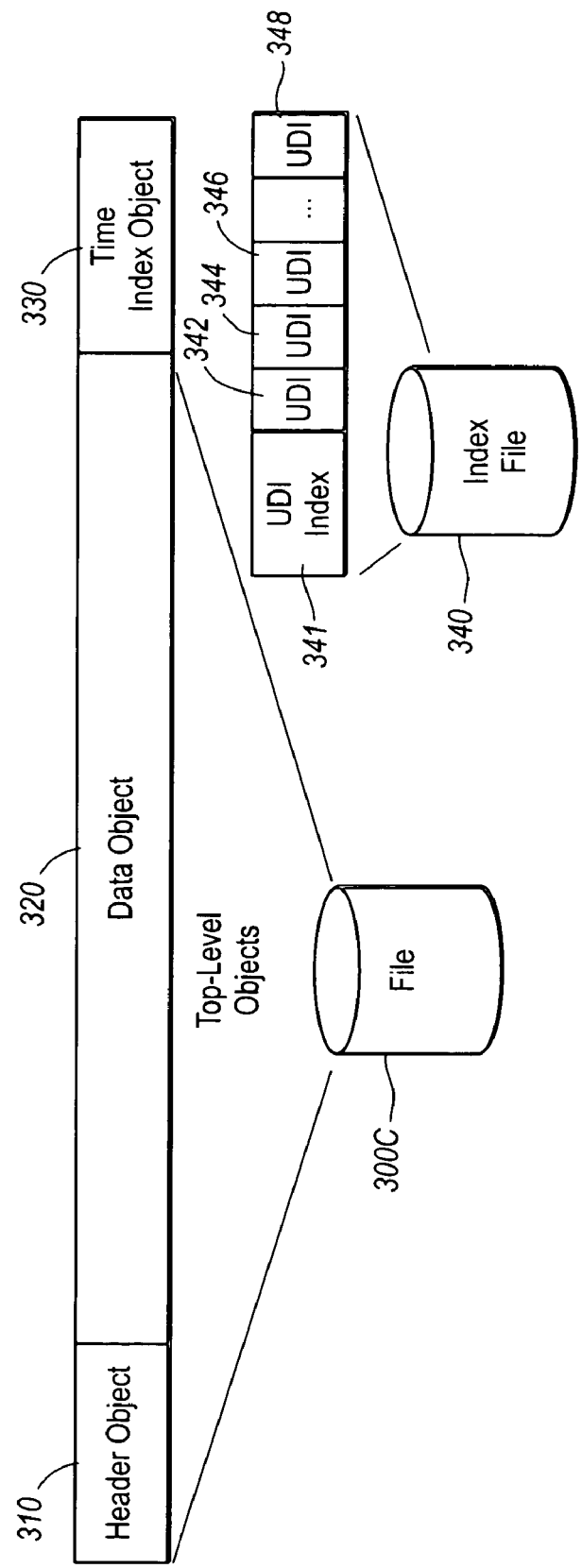

When the analysis criteria of a filter is met or satisfied, the sample is flagged and an index entry is subsequently generated for the content under analysis. (An example multimedia index is described in greater detail below with respect to FIG. 4.) For example, as shown in FIG. 2, index 210 was generated based on the analysis criteria of filter 110 being met, index 220 was generated based on the analysis criteria of filter 120 being met, and index 230 was generated based on the analysis criteria of filter 130 being met. Following analysis by the filters, the generated index entries are saved in storage 150. (FIGS. 3A-3C show example file formats for storing multimedia indexes.) The indexes also may be stored in a temporary memory, such as an index cache, so the entries are accessible while the index is being built.

The analysis of the filters may be applied to multimedia content in real-time as the content is received from a broadcaster or other source, or may be applied as a post-processing operation. For example, as a personal video recorder (PVR), such as the one described below with respect to FIG. 5, receives multimedia content, several indexes may be created.

PVRs frequently are used as time shifting devices. For a recorded program, it may be desirable to fast forward (or rewind), which may be implemented as a seek ahead/back a given amount of time or a given number of I-frames, requiring either a time-based index or a frame-based index. During playback, a user may be bored or uninterested with a particular scene and want to skip forward to the next scene, or may enjoy a particular scene and wish to play the scene back again, in which case a scene change index is needed. For content subject to conditional access (such as premium movie channels, pay-per-view, etc.), randomly seeking within the content may require locating content protection information in order to view the content, in which case a content protection index would be helpful.

A user may desire to locate a particular character within the multimedia content, in which case a voice change index may be needed, and depending on the sophistication of the filter, the filter may be able to index whenever the particular character speaks within the content. When closed captioning information is displayed, seeking to any of various indexes may start the closed caption in the middle of a word. Accordingly, a closed captioning index could be used as a fine adjustment to a more coarsely specified starting point within the content. For example, when seeking by time or frame, the actual time or frame may be altered using the closed captioning index to help assure that complete closed captioning information can be displayed when playback begins.

Similarly, PVRs may implement content jumps or skips of fixed amounts of time, such as 30 seconds. However, if a new scene begins in 25 seconds or 35 seconds, it is likely that the user would prefer jumping directly to the scene change, rather than rigidly holding to an exact 30 seconds. Here too, one index may be used as a fine adjustment to another index. The scene index can be used to alter a 30-second jump slightly, since it is most probable the user would prefer to navigate directly to the new scene, rather than having to rewind or fast forward manually after making the fixed 30-second jump.

Users also may wish to define their own indexes. For example, a user may wish to index favorite scenes within the multimedia content. The favorite scene index could be built on top of the scene index, or could be completely independent index. A favorite scenes index illustrates a filter and index with criteria based, at least in part, on receiving some form of input from the user. One of the problems that may be encountered with traditional indexes is the inability to keep similar indexes (e.g., scene-based indexes) from interfering with each other. In other words, keeping a separate index for all scenes, for one user's favorite scenes, and for another user's favorite scenes has not been possible. Indexing in accordance with the present invention, as described below with respect to the embodiment illustrated in FIG. 4, allows for arbitrary indexing multimedia content, including the generation and/or addition of multiple indexes of the same type for the same content. In view of the foregoing, it should be emphasized that many possible environments exist for practicing the present invention—the PVR environment illustrated in FIG. 5 and the personal computer environment illustrated in FIG. 6 are merely two examples.

In another example, the scenes and VBI data within a newscast could be analyzed to generate two indexes for content: 1) scene changes on video, 2) programming type e.g. headlines, sports, weather, etc. The PVR could combine these two indexes so that one newscast could be replayed in a customized manner for two viewers from the same recording.

Viewer A might prefer to watch only headlines and sports, in that order. Viewer B might prefer to watch weather first, then headlines, then sports.

Similarly, a voice-recognition index might allow a third viewer of the same newscast to watch only the content when the news anchor is speaking.

Another possible use of an index is a real-time analysis. For example, some analysis module might measure the average color of each frame and store a moving average once a second. Other modules might measure the video bit-rate, also sampled over a one-second duration. Several such measures might be combined to post-process the file and detect subtle correlations between the various measures to categorize passages of video.

Each entry (see FIG. 4, below) generated in a index can have some data associated with it. Generally, this data will be relatively small, but it will allow the multimedia filters to store some context with the entry. For example, the PVR might generate a thumbnail preview of the newscast recording. Each of the thumbnails might have some trans-coded VBI data that was present at the time of the scene change. The scene change entry might store a scene indexing number, and/or other type of context information.

Figure 4:
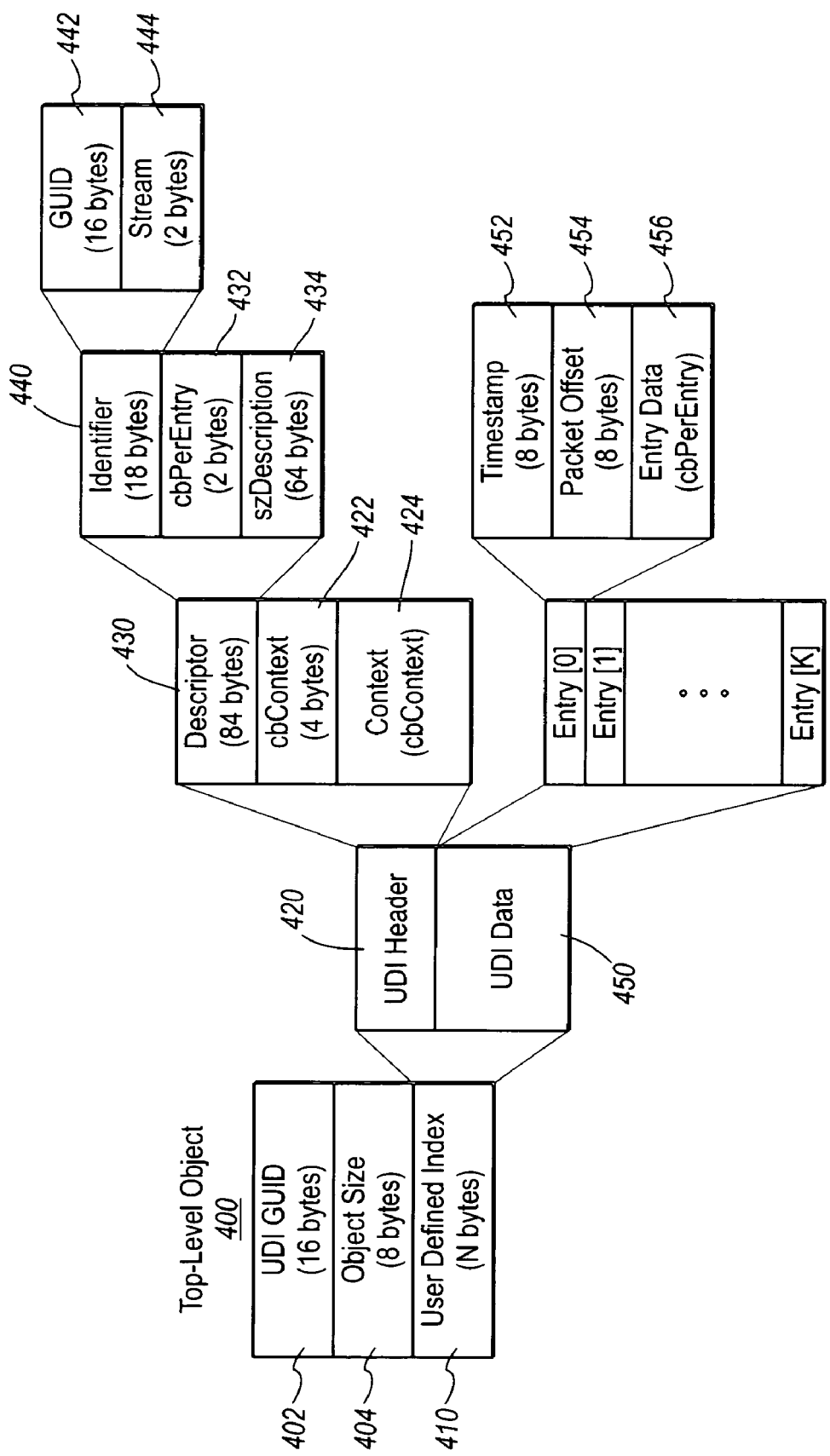
FIG. 4 illustrates an example multimedia index data object.

As indicated above, FIGS. 1A-1C illustrate example arrangements of multimedia content filters. FIG. 1A shows a serial or sequential arrangement of filters 110, 120, and 130 for indexing the multimedia content received from source 100. In one embodiment, the filters tag individual samples of multimedia content via an interface to add an attribute of {GUID,blob} form. Subsequently, collection code associated with the filters scan samples for the presence of the attribute and makes an index entry with the blob content of the attribute in an index with the attributes GUID. As described in more detail below, FIG. 4 shows an example index. This arrangement allows filters to be very simple: there are no required callback interfaces or complicated synchronization semantics.

Because the analysis performed by the filters requires some amount of processing time, filters generally introduce at least some delay when processing the content. FIG. 1B illustrates a parallel arrangement of filters 110, 120, and 130. The parallel arrangement allows for simultaneous analyzing the multimedia content with multiple filters, and therefore reduces overall processing time. However, each of the parallel filters may introduce a different amount of delay in the multimedia content they process. Synchronizer/multiplexer 140 takes the analyzed multimedia content from each filter and produces a single multimedia content stream, with the indexes from each filter. It should be noted that the present invention does not impose any limitation on the number of indexes that may be associated with the multimedia content.

FIG. 1C shows a combination of serial filters 110 and 120 in parallel with filter 130. Again, synchronizer/multiplexer 140 takes the multimedia content streams in parallel and produces a single content stream. As described in greater detail below with respect to FIGS. 3A-3C, storage 150 may take a variety of forms, including storage within the multimedia content itself and storage that is external to the multimedia content. Of course, FIGS. 1A-1C are intended to illustrate some basic embodiments for serial and parallel filter combinations—many other combinations, as described briefly below, are possible and fall within the scope of the invention.

Although FIGS. 1A-1C show relatively simple filter arrangements or topologies, multimedia content may flow in any arbitrary topology between the analysis filters, such as skipping filters, jumping filter branches, feedback (recursive) loops, and the like. Since filters may be implemented in software, in hardware, or a combination of hardware and software, topologies may cover the full range of software and/or hardware branching options. In some embodiments, one or more filters may store an arbitrary number of samples or other data, including state data, internally for comparison with newly arriving samples. Alternatively, certain data may be included within the index blob or otherwise associated, perhaps temporarily, with the samples themselves. It also should be noted that filters may communicate analysis results, intermediate calculations or computations, or other data with each other to improve performance and/or create arbitrarily complex filters. In this manner, multiple individual filters may be combined to produce a composite filter, with some or all of the attributes of each constituent filter. Furthermore, filters need not process the same multimedia stream. For example, one filter may process a video stream while another filter processes an audio stream, such as a scene detection video filter that uses audio information to hint at scene changes. Of course, the scene detection filter could also be implemented as a third filter that uses analysis (results, intermediate calculations or computations, etc.) from the video stream filter and the audio stream filter in detecting scene changes. Simply stated, filter topologies that support arbitrary ordering, feedback and crosstalk with shared data on multiple data stream are all within the scope of the present invention.

The analysis performed by filters 110, 120, and 130 may be performed as the content is being received and/or may be conducted as part of a post-processing analysis. In either case, the multimedia content may already include existing indexes. As indicated above, the indexing may be saved or stored for subsequent access as either temporary or transitory indexing or as long-term indexing.

FIG. 2 shows multimedia content 200 with example indexes generated in connection with the filters illustrated in FIGS. 1A-1C. Entries within each index reference arbitrary portions or samples of the multimedia content. As used in this application, the term "sample" should be interpreted broadly in include any accessible subset of the multimedia content. For example, samples may be defined or described in terms of the underlying data format of the multimedia content (bytes, frames, etc.) and/or in terms of one or more existing indexes or index entries.

Index 210 include type 1 index entry 212, type 1 index entry 214, type 1 index entry 216, and type 1 index entry 218. Index 220 includes type 2 index entry 222, type 2 index entry 224, type 2 index entry 226, and type 2 index entry 228. Note that type 2 index entry 228 and type 1 index entry 218 reference the same multimedia content. This is simply an indication that the sample met the criteria for both filters. Index 230 includes type 3 begin index entry 232 and type 3 end index entry 234. Note that index 230 explicitly defines a span or sample of multimedia content using a "begin" and an "end" index entry. Other indexes may simply imply a sample or span based on one or more index entries. Although not shown in FIG. 2, other indexes may be built using existing indexes or portions of existing indexes. Accordingly, a fourth index, for example, could be made up of type 1 index entry 212, type 2 index entry 224, and type 1 index entry 218.

FIGS. 3A-3C show example file formats for storing multimedia content indexes. In one embodiment, files for storing multimedia content are formatted in accordance with Microsoft's Advanced Systems Format (ASF). FIG. 3A shows that multimedia file 300A contains various top-level objects, including a header object 310, a data object 320, a time index object 330, and a user-defined index 340, with index entries 342, 344, 346, and 348. Header object 310 includes information about the multimedia file itself, data object 320 includes the multimedia content of the file, and time index object 330 is a time-based index for the multimedia content that allows for seeking into the multimedia content by specifying a time. In this embodiment, the user-defined index entries for the multimedia content are stored at the end of the file.

In FIG. 3B, file 300B includes a header object 310; multiple data objects 322 and 324, user-defined index entries 342, 344, and 346, a meta user-defined index entry 341, and a time index object 330 as top-level objects. Note, however, in contrast to FIG. 3A, that the user-defined index entries are distributed throughout multimedia file 300B. Meta user-defined index entry 341 includes pointers to each user-defined index entries, and therefore acts as an index to the index entries. To aid navigation, each user-defined index entry includes previous/next pointers.

FIG. 3C shows multimedia file 300C and a separately stored user-defined index 340. Similar to FIGS. 3A and 3B, file 300C includes header object 310, data object 320, and time index object 330 as top-level objects. User-defined index 340 includes an index 341 for the user-defined index entries 342, 344, 346, and 348. Of course, as described above, user-defined indexes may be stored temporarily, such as in an index cache or other memory, or more permanently, as is suggested by the file formats illustrated in FIGS. 3A-3C. It also should be noted that multimedia content and indexes may be stored in a wide range of file formats. Accordingly, the foregoing description of FIGS. 3A-3C is provided merely as a description of example file formats and should not be interpreted as limiting the scope of the invention.

FIG. 4 illustrates an example multimedia index data object. As with the example file formats described above with respect to FIGS. 3A-3C, multimedia index objects may be stored in a wide range of data objects, and therefore the example multimedia index data object shown in FIG. 4 should not be interpreted as limiting the scope of the invention. Top-level object 400 includes a globally unique identifier (GUID) 402 that identifies the object as a user-defined index (UDI), an object size 404 defining the size of the index structure, and the user-defined index 410 itself. User-defined index 410 includes a UDI header 420 and UDI data 450. The UDI header 420 includes a descriptor 430 for the index, context data size 422 (i.e., the data size for context 424), and context data 424 for storing data that is specific to the particular type of index. The descriptor 430 includes an identifier 440, index entry data size 432 (i.e., the data size of entry data 456), and a description 434 for the index. The identifier 440 includes a GUID 442 for the index and a stream identifier 444 for identifier the appropriate multimedia content stream.

GUID 442 is intended to describe the type of index (e.g., scene, voice, commercial, etc.). Stream identifier 444 is used because the same index may be applied to different streams within the multimedia content (e.g., the audio stream, the video stream, etc.). It is also possible to have more than one index on a particular stream. For example, a user may wish to index commercials, scene changes, and frames, all on the video stream. Accordingly, each index will have a different GUID (commercials, scene changes, and frames), but will reference the same stream.

UDI data 450 includes various index entries, labeled Entry [0], Entry[1], and Entry[K] in the figure. Each entry includes a timestamp 452, a packet offset 454, and entry data 456. Timestamp 452 is a time offset into the multimedia content, packet offset 454 is a position offset into the multimedia content, and entry data 456 is a blob that can be used to hold application specific data for the index. Accordingly, at a high-level, a {GUID,blob} attribute exists for each indexed sample (e.g., GUID 442 and entry data 456), where the GUID distinguishes between different indexes and the blob holds application or index specific data. In FIG. 4, entry data 456 is shown as a fixed size, but in other embodiments variable sized data may be appropriate.

An example pseudo-code embodiment of a programming interface for indexing multimedia content may be found at the end of this specification.

Figure 8:
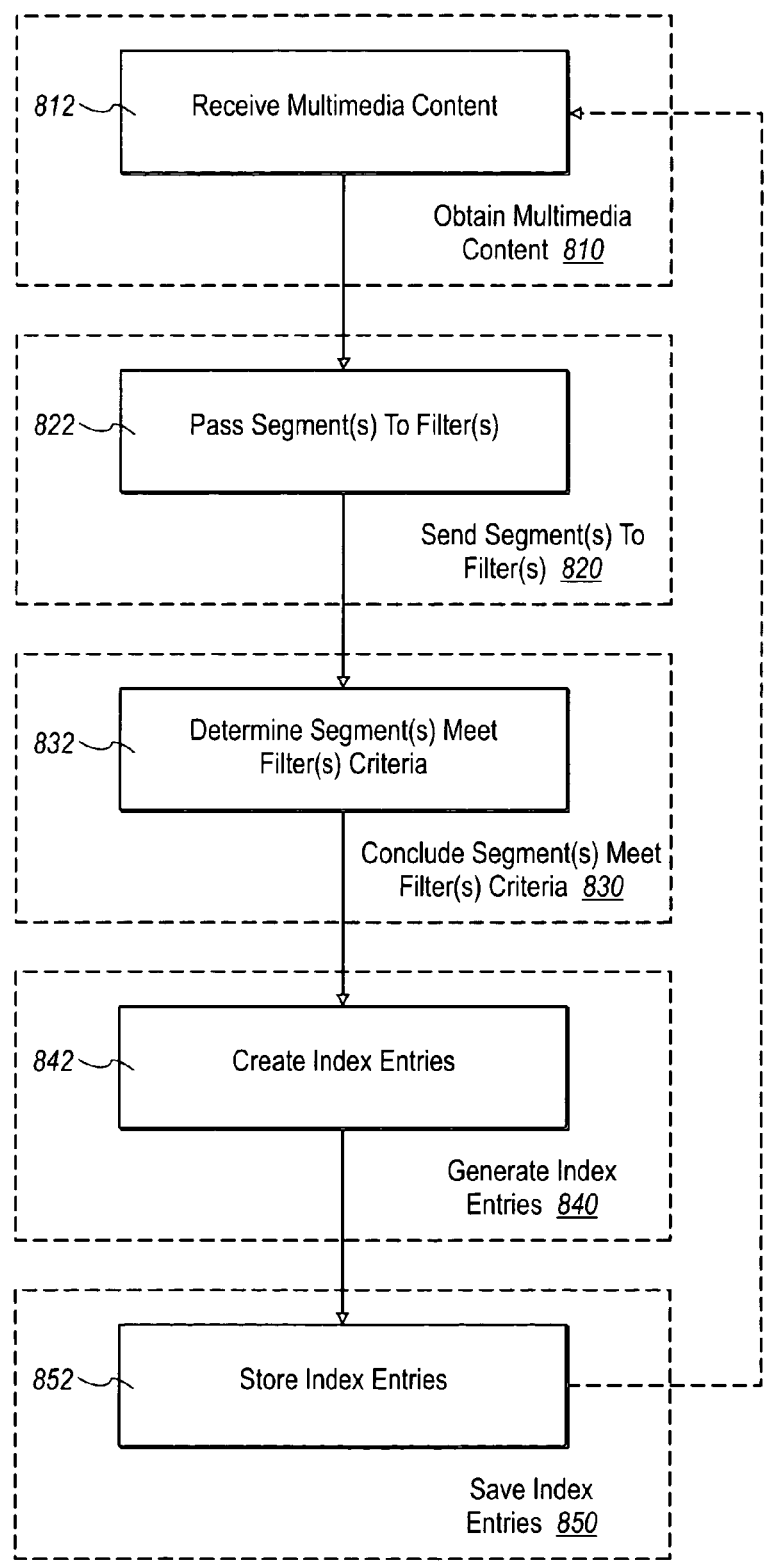
FIG. 8 shows example acts and steps for methods of adding an arbitrary index to multimedia content in accordance with the present invention.

The present invention also may be described in terms of methods comprising functional steps and/or non-functional acts. FIG. 8 shows example acts and steps for methods of adding an arbitrary index to multimedia content in accordance with the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

A step for obtaining (810) one or more multimedia content streams, each comprising one or more samples may include an act of receiving (812) the one or more multimedia content streams. A step for sending (820) at least one sample to one or more multimedia filters for analysis based on one or more criteria that define an index type for each of the one or more multimedia filters may include an act of passing (822) the at least one sample to the one or more multimedia filters. A step for concluding (830) that the at least one sample meets the one or more criteria for an arbitrary filter and index type may include an act of determining (832) that the at least one sample meets the one or more criteria. A step for generating (840) an index entry that identifies the at least one sample and the index type of the arbitrary filter, the index entry being adapted in accordance with a common, extensible indexing scheme to coexist and not interfere with one or more other index entries of either a same or different type for the at least one sample may include an act of creating (842) the index entry. A step for saving (850) the index entry for subsequent access may include an act of storing (852) the index entry. As described above, index entries themselves may be further indexed to create an index hierarchy, which is illustrated by the dashed line from the act of storing (852) the index entry to the act of receiving (812) one or more multimedia content streams. It should also be noted here that for parallel filtering/ analysis the multiplexing/synchronization of, for example, FIGS. 1B and 1C may be included within the processing illustrated in FIG. 8.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
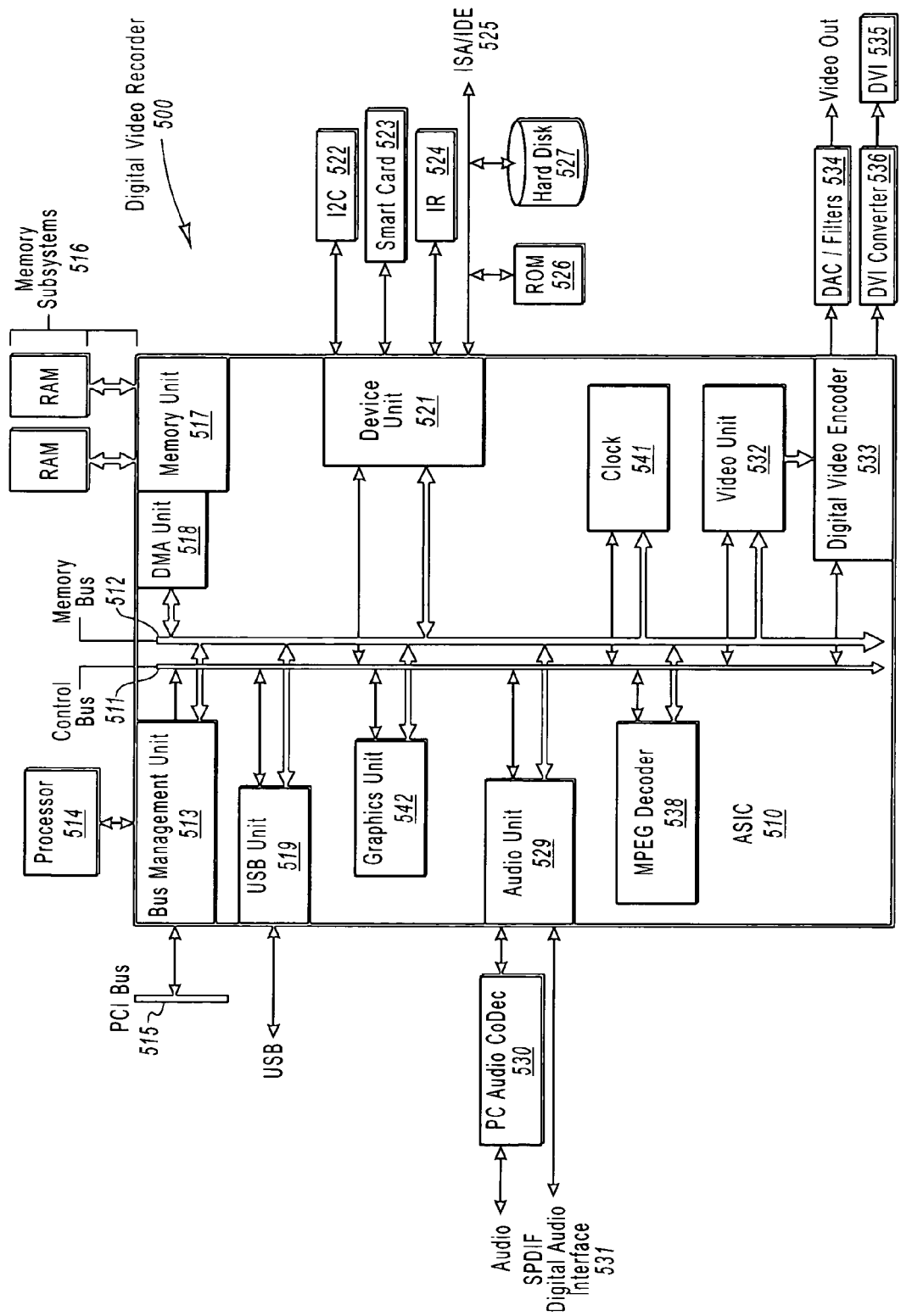
FIGS. 5 and 6 illustrate example systems that provide suitable operating environments for the present invention.
Figure 6:
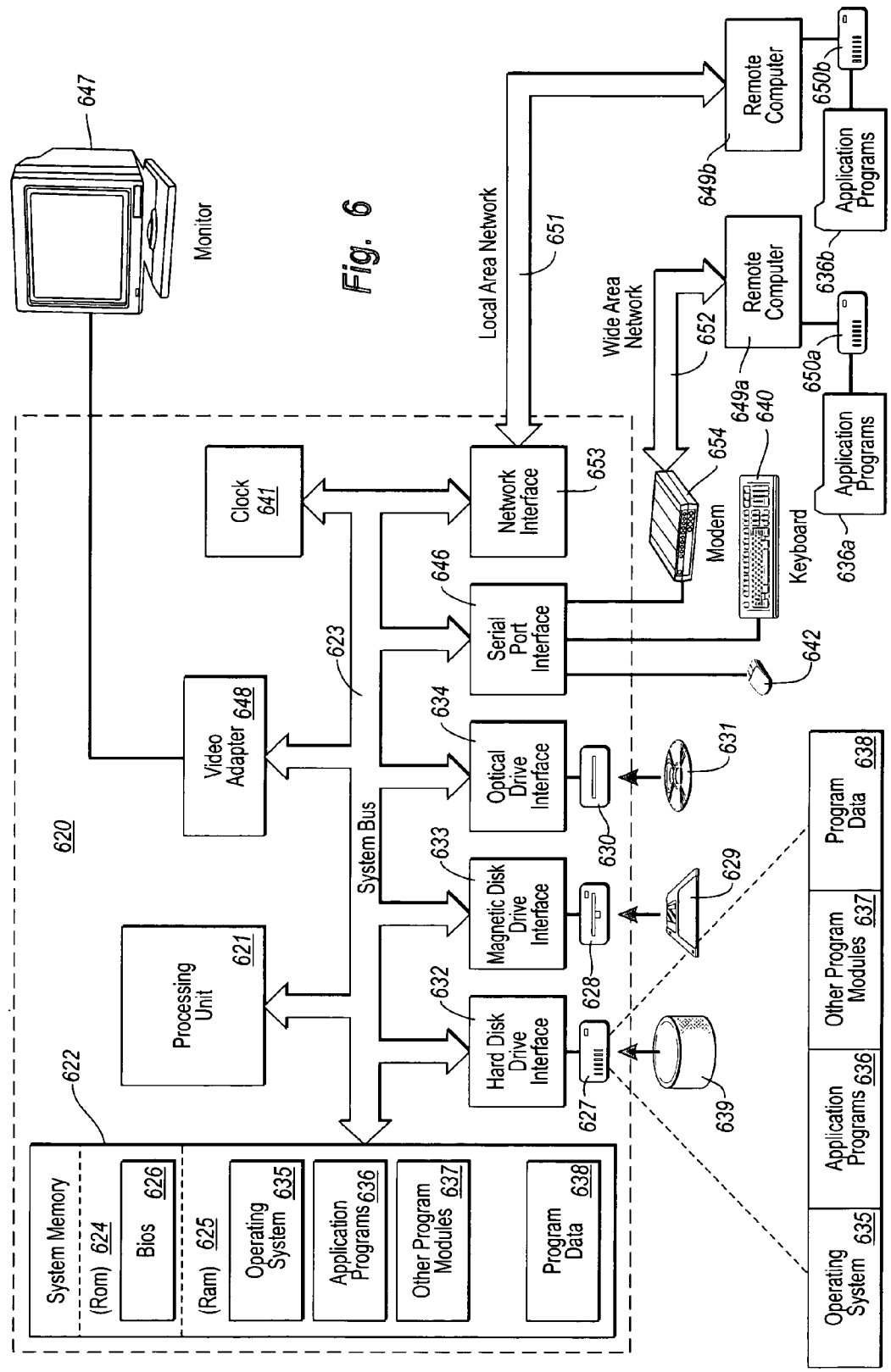

FIG. 5 illustrates an example application specific integrated circuit ("ASIC") 210 for a digital or personal video recorder 500. Of course, the present invention may be practiced in a variety of environments and is in no way limited to the specific example shown in FIG. 5. The ASIC 510 includes a number of components that communicate over a control bus 511 and a memory bus 512. The control bus 511 carries relatively low bandwidth control information that controls the operation of each of the components of the ASIC 510. The memory bus 512 carries higher bandwidth information such as video information between each of the components of the ASIC 510 and memory. A bus management unit 513 manages the communication over the control bus 511 and also interfaces with a processor 514 and a PCI bus 515.

The processor 514 oversees the general video processing by dispatching instructions over the control bus 511 instructing the various components of the ASIC 510 to perform their specialized tasks. The processor 514 also monitors the progress of such tasks, thus controlling the various components of ASIC 510 in a coordinated fashion. The processor 514 may be any processor capable of performing such oversight functions including a MIPS or X86 architecture processor.

Typically, memory is required to perform such coordinated operations. Accordingly, the ASIC 510 has access to one or more memory subsystems 516 which provide volatile memory that is shared between the components of the ASIC 510. The memory subsystems 516 may be any memory subsystem that allows for rapid access to stored information. For example, the memory subsystems 516 may be SRAM or DRAM.

A memory unit 517 communicates directly with the memory subsystems 516. The memory unit 517 is more efficient if there are large, less frequent accesses to the memory subsystems 516. However, many of the components of the ASIC 510 may operate most efficiently when there are smaller, but more frequent memory transactions. The direct memory access ("DMA") unit 518 acts as a buffering interface such that the components may have small, frequent transactions with the DMA unit 518, while leaving it up to the DMA unit 518 to bundle the smaller transactions into larger, less frequent transactions for the memory unit 517 to conduct with the memory subsystems 516. In this manner, when a component needs to access the memory subsystems 516, the component either communicates directly with the memory unit 517 or communicates through the DMA unit 518 depending on the nature of the transaction.

A universal serial bus ("USB") interface 519 is capable of running a universal serial bus. The USB unit 519 may be any conventional USB interface that is capable of interfacing with the control bus 511 and the memory bus 512.

A device unit 521 includes interfaces for a number of miscellaneous devices. For example, the device unit 521 contains a bi-directional interface for an I2C bus 522 for communication with external components, a bi-directional interface for a smart card 523, a bi-directional infra red ("IR") serial interface 524, and a bi-directional ISA/IDE bus 525 that interfaces with a read only memory 526, a hard disk drive 527, as well as a number of other devices such as a DVD-ROM drive.

A graphics unit 542 comprises a 3-D graphic rendering engine that may be, for example, an eight million polygon DirectX7 compatible 3-D graphics unit.

An audio unit 529 drives a PC audio interface 530 such as an AC'97 audio interface that may receive or transmit audio. The audio unit 529 may also drive other audio interfaces including a digital interface such as SPDIF digital audio interface 531.

A video unit 532 receives video data from the memory bus 512 and converts the video data into a digital display. The video unit 532 handles multiple windows of video data and may operate in RGB, YUV, or other color formats as needed. The video unit 532 provides the digital display data to the digital video encoder 533 which converts the digital display data into the desired format (e.g., NTSC or HDTV) and provides the digital video through a digital to analog converter ("DAC") and filter 534 to a composite, S-Video or component output. The digital video encoder 533 also may output the video to a digital video interface ("DVI") 535 using a DVI converter 536.

An MPEG decoder 538 is provided to decode MPEG streams. The MPEG decoder also performs subsample decoding by reducing the frame size of the resulting decoded frame.

A clock 541 synchronizes the components of the system with each other. Accurate clocks also can provide somewhat loose synchronization with external devices that have their own clocks, without any feedback or exchange of clock signals between the devices. In this way, indexes driven by clock times may be produced and stored, and then exchanged between different devices and/or multimedia content consumers.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Similar to clock 541 of FIG. 5, a clock 641 synchronizes the components of the system with each other. As noted above, accurate clocks also can provide somewhat loose synchronization with external devices that have their own clocks, without necessarily requiring any feedback or exchange of clock signals between the devices. In this way, indexes driven by clock times may be produced and stored, and then exchanged between different devices and/or multimedia content consumers.

Program code means comprising one or more program modules may be stored on the magnetic hard disk 639, removable magnetic disk 629, removable optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

FIGS. 7A-7L illustrate example programming interfaces in accordance with embodiments of the present invention. A programming interface (or more simply, interface) may be viewed as any mechanism, process, protocol for enabling one or more segments of code to communicate with or access the functionality provided by one or more other segments of code. Alternatively, a programming interface may be viewed as one or more mechanisms, methods, function calls, modules, objects, etc. of a component of a system capable of communicative coupling to one or more mechanisms, methods, function calls, modules, etc. of other components. The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 7C:
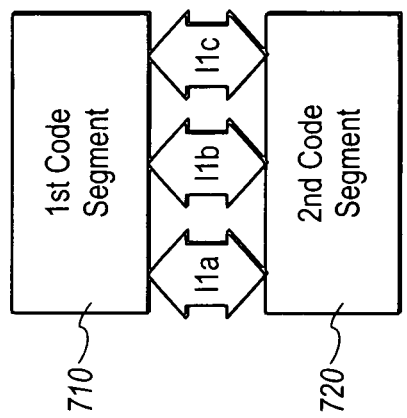
FIGS. 7A-7L illustrate example programming interfaces in accordance with embodiments of the present invention.
Figure 7B:
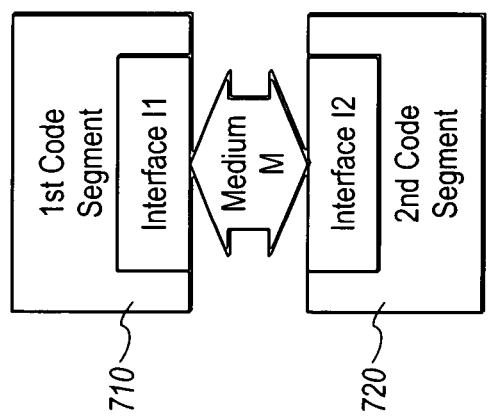
Figure 7A:
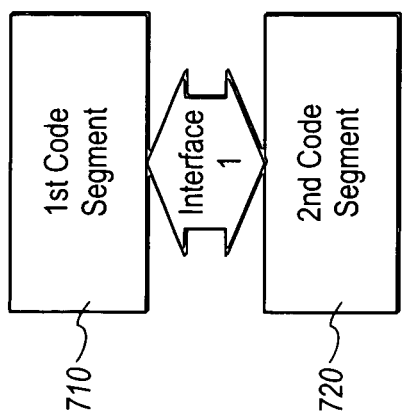

Notionally, a programming interface may be viewed generically, as shown in FIG. 7A or FIG. 7B. FIG. 7A illustrates an interface Interface1 as a conduit through which first and second code segments 710 and 720 communicate. FIG. 7B illustrates an interface as comprising interface objects I1 and I2 (which may or may not be part of the first and second code segments), which enable first and second code segments 710 and 720 of a system to communicate via medium M. In the view of FIG. 7B, one may consider interface objects I1 and I2 as separate interfaces of the same system and one may also consider that objects I1 and I2 plus medium M comprise the interface. Although FIGS. 7A and 7B show have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment 710 transmits information (where "information" is used in its broadest sense and includes data, commands, requests, etc.) to the second code segment 720; the method whereby the second code segment 720 receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 7A and 7B, but they nonetheless perform a similar function to accomplish the same overall result. We will now briefly describe some illustrative alternative implementations of a programming interface.

Factoring

A communication from one code segment to another may be accomplished indirectly by breaking the communication into multiple discrete communications. This is depicted schematically in FIGS. 7C and 7D. As shown, some interfaces can be described in terms of divisible sets of functionality. Thus, the interface functionality of FIGS. 7A and 7B may be factored to achieve the same result, just as one may mathematically provide 24, or 2 times 2 times 3 times 2. Accordingly, as illustrated in FIG. 7C, the function provided by interface Interface1 may be subdivided to convert the communications of the interface into multiple interfaces Interface1A, Interface1B, Interface1C, etc. while achieving the same result.

Figure 7F:
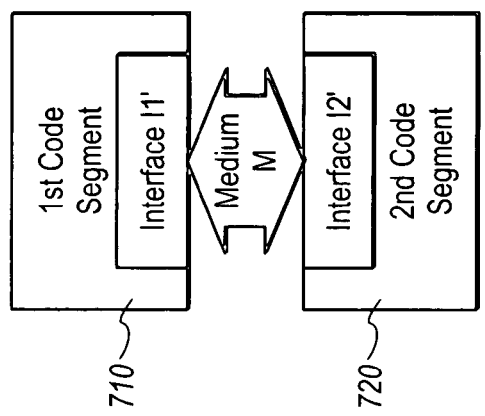
Figure 7E:
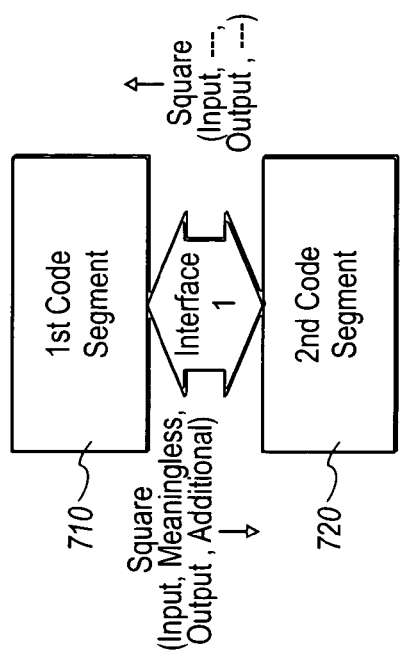
Figure 7D:
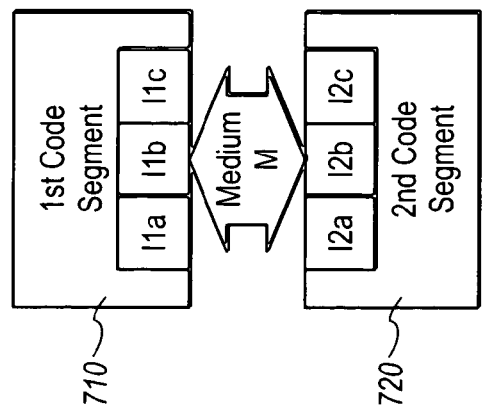

As illustrated in FIG. 7D, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the first code segment need not match the number of interfaces included with the second code segment. In either of the cases of FIGS. 7C and 7D, the functional spirit of interfaces Interface1 and I1 remain the same as with FIGS. 7A and 7B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition

In some cases, it may be possible to ignore, add or redefine certain aspects (e.g., parameters) of a programming interface while still accomplishing the intended result. This is illustrated in FIGS. 7E and 7F. For example, assume interface Interface1 of FIG. 7A includes a function call Square (input, precision, output), a call that includes three parameters, input, precision and output, and which is issued from the first code segment 710 to the second code segment 720.

If a parameter, such as precision, is of no concern in a given scenario, as shown in FIG. 7E, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result.

Similarly, as shown in FIG. 7F, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Inline Coding

It may also be feasible to merge some or all of the functionality of two separate code modules such that the "interface" between them changes form. For example, the functionality of FIGS. 7A and 7B may be converted to the functionality of FIGS. 7G and 7H, respectively. In FIG. 7G, the previous first and second code segments 710 and 720 of FIG. 7A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect.

Figure 7H:
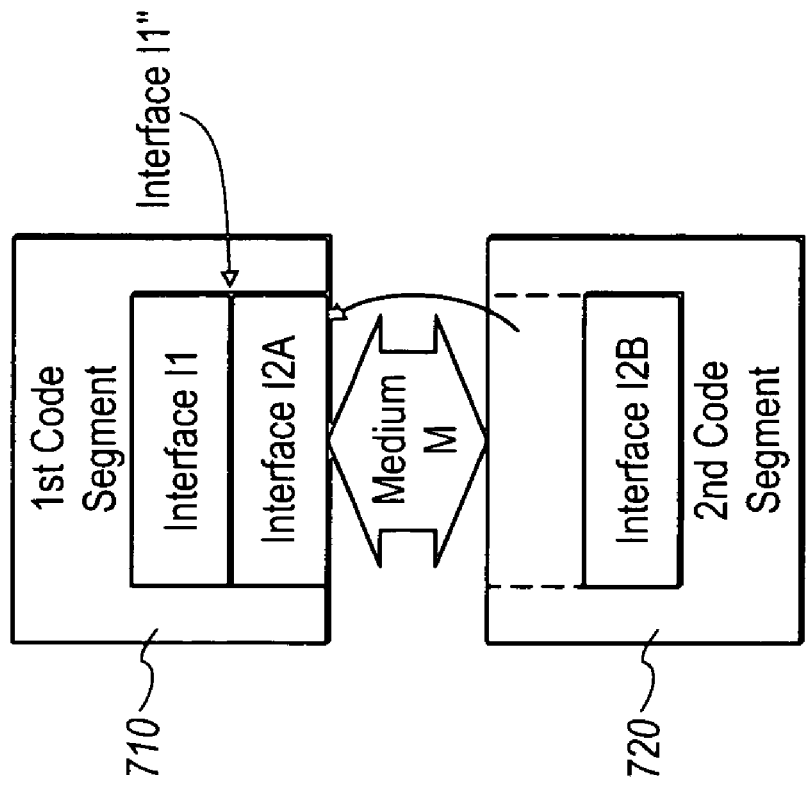
Figure 7G:
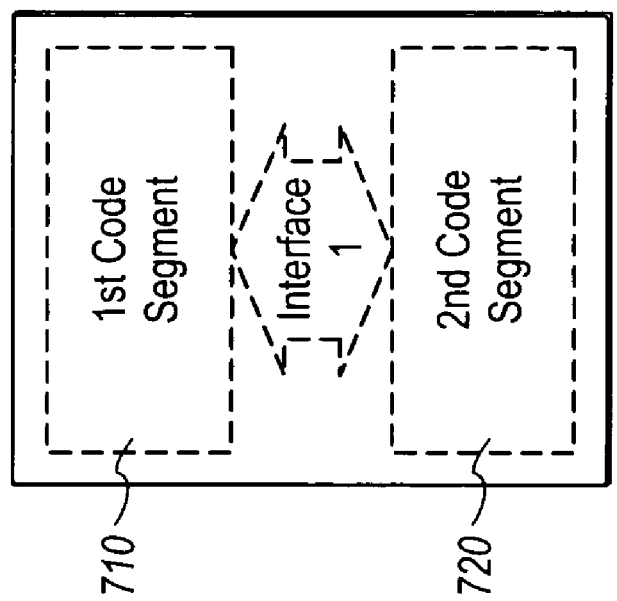

Similarly, shown in FIG. 7H, part (or all) of interface I2 from FIG. 7B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 7B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Divorce

A communication from one code segment to another may be accomplished indirectly by breaking the communication into multiple discrete communications. This is depicted schematically in FIGS. 7I and 7J. As shown in FIG. 7I, one or more pieces of middleware (Divorce Interfaces DI, since they divorce functionality and/or interface functions from the original interface) are provided to convert the communications on the first interface, Interface1, to conform them to a different interface, in this case interfaces Interface2a, Interface2b and Interface2c. This might be done, e.g., where there is an installed base of applications designed to communicate with, say, an operating system in accordance with an Interface1 protocol, but then the operating system is changed to use a different interface, in this case interfaces Interface2a, Interface2*b* and Interface2*c*. The point is that the original interface used by the second code segment is changed such that it is no longer compatible with the interface used by the first code segment, and so an intermediary is used to make the old and new interfaces compatible.

Figure 7J:
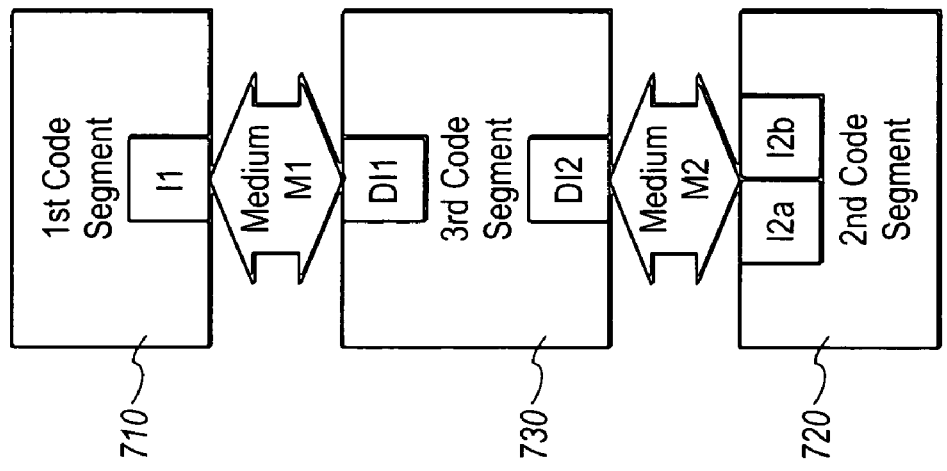
Figure 7I:
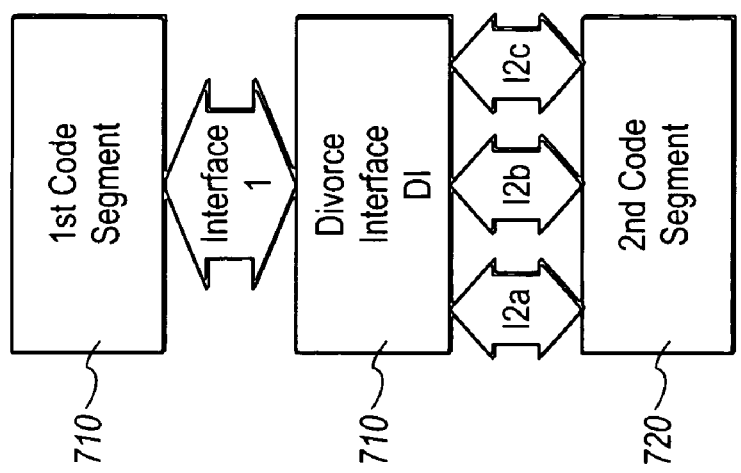

Similarly, as shown in FIG. 7J, a third code segment can be introduced with divorce interface DI1 to receive the communications from interface I1 and with divorce interface DI2 to transmit the interface functionality to, for example, interfaces I2*a* and I2*b*, redesigned to work with DI2, but to provide the same functional result. Similarly, DI1 and DI2 may work together to translate the functionality of interfaces I1 and I2 of FIG. 7B to a new operating system, while providing the same or similar functional result.

Rewriting

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a just-in-time (JIT) compiler or interpreter 740 in an execution environment (such as that provided by the Net framework, the Java runtime environment, or other similar runtime type environments). The JIT compiler 740 may be written so as to dynamically convert the communications from the first code segment 710 to the second code segment 720, i.e., to conform them to a different interface, such as the interface shown in new first code segment 711, as may be required by the new second code segment 722 (either the original or a different second code segment). This is depicted in FIGS. 7K and 7L.

Figure 7K:
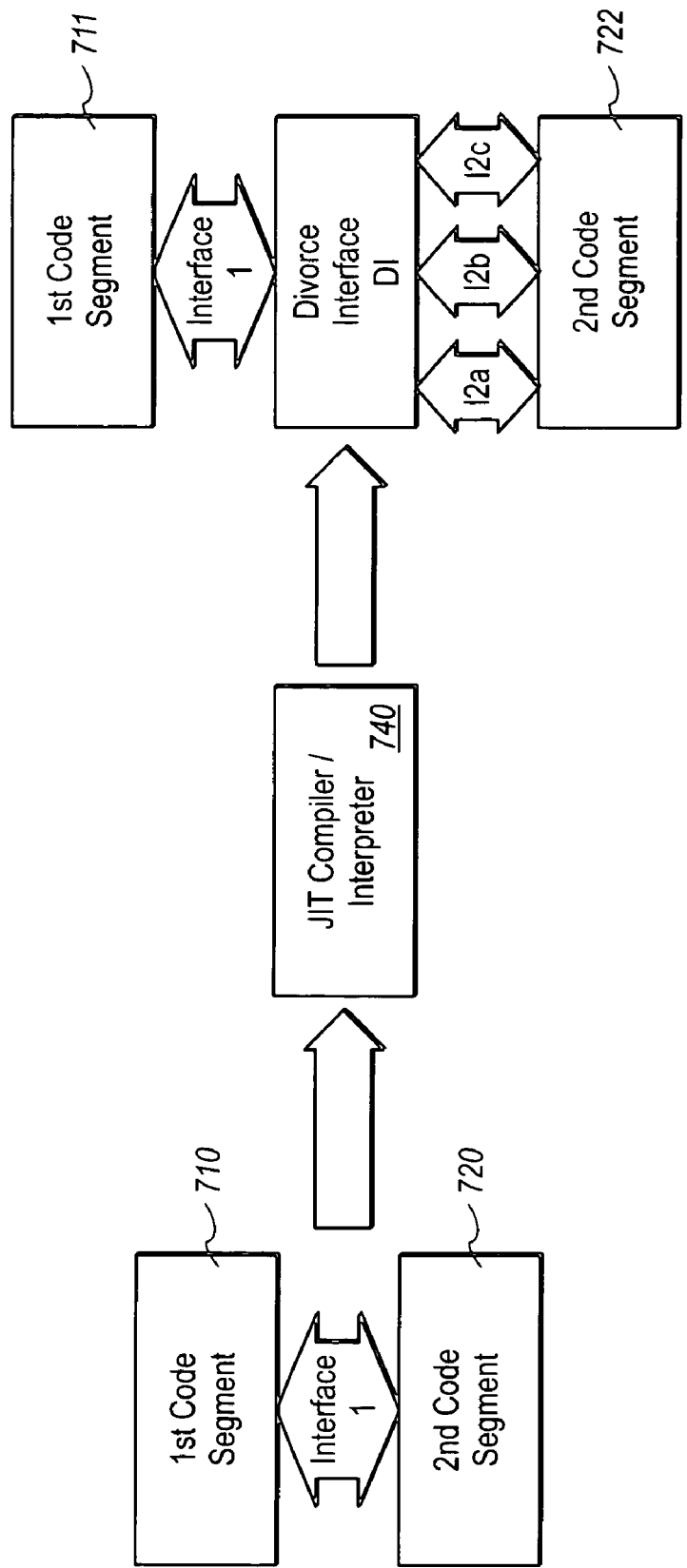
Figure 7L:
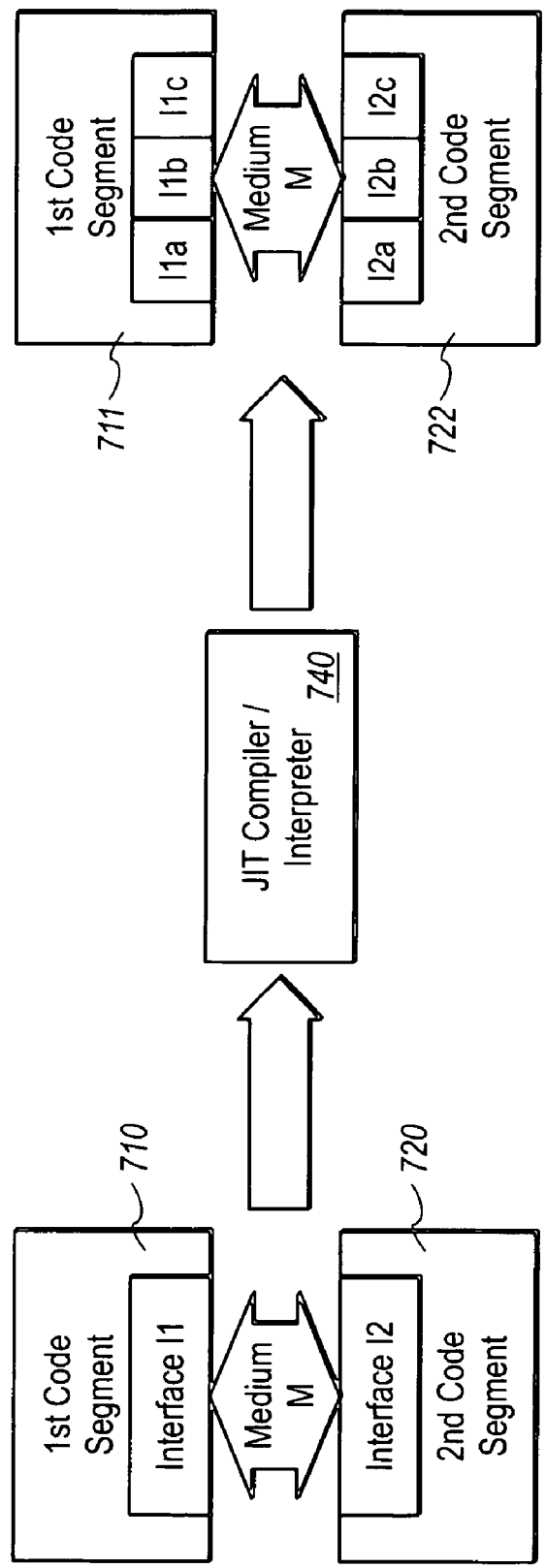

As can be seen in FIG. 7K, this approach is similar to the divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 7L, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 7A and 7B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

COMPUTER PROGRAM LISTING
PROGRAMMING INTERFACE

```
Structures
//    uniquely identifies an index: {guid,stream}
//        *   GUIDs identify a unique index; some GUIDs are well-known e.g.
//            MF_TIME_FORMAT_TIMECODE, others are known only by the
//            hosting application it is legal to use the same GUID on more
//            than 1 stream
//        *   wStreamId must match a stream in the profile; samples on that
//            stream will be indexed
typedef struct _SBECORE_INDEX_IDENTIFIER {
    GUID     Id ;
    WORD     wStream ;
} * PSBECORE_INDEX_IDENTIFIER, SBECORE_INDEX_IDENTIFIER ;
//    maximum length of the index descriptive string; time-based indexes
//        cannot have a descriptive string
#define SBECORE_INDEX_MAX_DESC_LEN 32
cpp_quote ("#define SBECORE_INDEX_MAX_DESC_LEN 32")
//    describes an index
//        *   Identifier uniquely identifies the index : {guid,stream}
//        *   cPerEntryDataBytes specifies how many private bytes are stored
//            with each entry; this field is ignored for a time-based index
//            i.e. of GUID SBECore_TimeIndex, but can be non-zero for a
//            user-defined index 0xff is reserved
//        *   szDescription contains a descriptive string; this field is
//            ignored for a time-based index
typedef struct _SBECORE_INDEX_DESCRIPTOR {
    SBECORE_INDEX_IDENTIFIER    Identifier ;
    WORD                        cPerEntryDataBytes ;
    WCHAR                       szDescription [SBECORE_INDEX_MAX_DESC_LEN];
} * PSBECORE_INDEX_DESCRIPTOR, SBECORE_INDEX_DESCRIPTOR ;
//    specifies an index configuration
//        *   Descriptor is a data structure as specified above
//        *   cbContext and pbContext are used to enter data that is specific
//            to the type of index being created; a time-based index is
//            well-known and its configuration is listed below
typedef struct _SBECORE_INDEX_CONFIG {
```

COMPUTER PROGRAM LISTING
PROGRAMMING INTERFACE

```
        SBECORE_INDEX_DESCRIPTOR    Descriptor ;
        DWORD                        cbContext ;
        [size_is (cbContext)] const BYTE *     pbContext ;
} *     PSBECORE_INDEX_CONFIG, SBECORE_INDEX_CONFIG ;
//      data structure passed up in a went-stale event
typedef struct _SBECORE_INDEX_STALE {
        SBECORE_INDEX_IDENTIFIER     Identifier ;
        LONGLONG                     llMinTime ;
        LONGLONG                     llMaxTime ;
} *     PSBECORE_INDEX_STALE, SBECORE_INDEX_STALE ;
ISBECoreUDIndexCollection
/*++
Interface Description:
        This interface is used to manage a number of User Defined Interfaces
            (UDIs).  UDIs are retrieved from via this interface.  This
            interface is associated with a grouping of UDIs e.g. on 1
            recording. This interface is retrieved from the object that is
            used to write or read to the grouping target e.g., a recording.
--*/
[
        object,
        uuid(a2a19a1d-3309-11d7-adb3-00065bc819a1),
        pointer_default(unique)
]
interface ISBECoreUDIndexCollection : IUnknown
{
        // NOTE: (GUID,stream) identify a unique UDI
        /*++
        Routine Description:
            This method returns the count of UDIs in the store from which
            this interface is obtained (via QueryInterface).
        Arguments:
            pcIndexes   returns the count of UDIs
        Return Values:
            Returns S_OK if the call succeeds, otherwise an HRESULT failure.
        --*/
        HRESULT
        GetCount (
            [out]    DWORD * pcIndexes
            ) ;
        /*++
        Routine Description:
            This method returns an a UDI interface pointer for the specified
            index.
        Arguments:
            dwPosition   0-based index position
            ppIndex      returns a refcounted pointer to the requested UDI
        Return Values:
            Returns S_OK if the call succeeds, otherwise an HRESULT failure.
        --*/
        HRESULT
        GetIndexFromPosition (
            [in]     DWORD                 dwPosition,
            [out]    ISBECoreUDIndex **    ppIndex
            ) ;
        /*++
        Routine Description:
            Returns an index, based on the identifying GUID
        Arguments:
            pUDIIdentifier    identifies the index
            ppIndex           returns a refcounted pointer to requested UDI
        Return Values:
            Returns S_OK if the call succeeds, otherwise an HRESULT failure.
        --*/
        HRESULT
        GetIndex (
            [in]     SBECORE_INDEX_IDENTIFIER *     pUDIIdentifier,
            [out]    ISBECoreUDIndex **             ppIndex
            ) ;
        /*++
        Routine Description:
            Returns position of the specified index, identified by the GUID.
        Arguments:
            pUDIIdentifier    identifies the index
            pdwPosition       returns the 0-based position of requested UDI
        Return Values:
            Returns S_OK if the call succeeds, otherwise an HRESULT failure.
```

COMPUTER PROGRAM LISTING
PROGRAMMING INTERFACE

```
        --*/
        HRESULT
        GetIndexPosition (
                [in]    SBECORE_INDEX_IDENTIFIER *       pUDIIdentifier,
                [out]   DWORD *                          pdwPosition
                );
};
ISBECoreUDIndex
/*++
Interface Description:
        This interface is used to access an individual User Defined Index
            (UDI). This interface is retrieved from a UDI collection. It
            is not used to generate entries. In SBE entries are generated
            via the use of extensible attributes.
--*/
[
        object,
        uuid(a2a19a1e-3309-11d7-adb3-00065bc819a1),
        pointer_default(unique)
]
interface ISBECoreUDIndex : IUnknown
{
        /*++
        Routine Description:
            Returns the UDI's descriptor.
        Arguments:
            pbDescriptor   byte array begins with the
                                SBECORE_INDEX_DESCRIPTOR structure
            cDescriptor    in:     bytes available in pbDescriptor
                           out:    returned length of pbDescriptor
        Return Values:
            Returns S_OK if the call succeeds, otherwise an HRESULT failure.
        --*/
        HRESULT
        GetDescriptor (
                [out,size_is (* pcDescriptor)]   BYTE *     pbDescriptor,
                [in,out]                         DWORD *    pcDescriptor
        );
        /*++
        Routine Description:
            Returns the current count of index entries
        Arguments:
            pcIndexEntry   returns the count of entries
        Return Values:
            Returns S_OK if the call succeeds, otherwise an HRESULT failure.
        --*/
        HRESULT
        GetCount (
                [out]   ULONGLONG * pcIndexEntry
                );
        /*++
        Routine Description:
            Returns an entry based on a position
        Arguments:
            ullPosition    0-based index to specify an entry
            pllTime        returned time of index
            pbEntryData    returned entry data
            cEntryData     in:     length of available bytes pointed to by
                                    pbEntryData
                           out:    actual length of entry data
        Return Values:
            Returns S_OK if the call succeeds, otherwise an HRESULT failure.
        --*/
        HRESULT
        GetEntryFromPosition (
                [in]                             ULONGLONG  ullPosition,
                [out]                            LONGLONG * pllTime,
                [out,size_is (* cEntryData)]     BYTE *     pbEntryData,
                [in,out]                         DWORD *    cEntryData
                );
        /*++
        Routine Description:
            Returns an entry based on time. The optional search direction
                can be used to indicate whether the nearest index entry
                before, at, or after the time to look for is retrieved.
                If no entries match the criteria, the call fails.
        Arguments:
```

-continued

COMPUTER PROGRAM LISTING
PROGRAMMING INTERFACE

```
    llTime          time to look for
    lSearchDir      search direction (0=before,1=at/after,2=closest)
    pullPosition    returned 0-based index to entry
    pbEntryData     returned entry data
    cEntryData      in:    length of available bytes pointed to by
                           pbEntryData
                    out:   actual length of entry data
Return Values:
    Returns S_OK if the call succeeds, otherwise an HRESULT failure.
--*/
HRESULT
GetEntryFromTime (
    [in]                          LONGLONG      llTime,
    [in]                          LONG          lSearchDir,
    [out]                         ULONGLONG *   pullPosition,
    [out,size_is (* cEntryData)]  BYTE *        pbEntryData,
    [in,out]                      DWORD *       cEntryData
    );
};
```

We claim:

1. For a system configured to process multimedia content, a computer program product comprising one or more computer readable storage media carrying computer executable instructions that implement a method of interfacing with a plurality of code samples for interacting with an arbitrary index to the multimedia content such that the arbitrary index is capable of coexisting with one or more other arbitrary indexes, the method comprising acts of:

defining at least four separate programming interfaces configured to communicate with each other, the at least three separate interfaces including a get-index programming interface, a get-index-from-position programming interface, a get-index-position programming interface, and a get-entry-from-time programming interface, wherein each such interface is defined such that:

the get-index programming interface retrieves one of a plurality of indexes for the multimedia content, the plurality of indexes including an existing index corresponding to the multimedia content and at least one other index, the get-index programming interface comprising at least three different parameters, including: (i) a parameter to identify the one index to retrieve, (ii) a parameter to identify the retrieved one index, and (iii) a return value to indicate whether or not a particular call to the get-index programming interface succeeds;

the get-index-from-position programming interface retrieves one of the plurality of indexes corresponding to the multimedia content based on a position of the retrieved index within the plurality of available indexes, the get-index-from-position programming interface comprising at least three different parameters, including: (i) a parameter to identify the position of the one index to retrieve, (ii) a parameter to identify the retrieved one index, and (iii) a return value to indicate whether or not a particular call to the get-index-from-position programming interface succeeds;

the get-index-position programming interface retrieves a position of one of the plurality of indexes within the plurality of indexes for the multimedia content, the get-index-position programming interface comprising at least three different parameters, including: (i) a parameter to identify the one index to retrieve, (ii) the position of the one index within the plurality of indexes, and (iii) a return value to indicate whether or not a particular call to the get-index-position programming interface succeeds; and the get-entry-from-time programming interface retrieves an index entry based on a time to search for the index entry within the multimedia content, wherein the get-entry-from-time programming interface includes an optional parameter to identify a search direction relative to the time to search, wherein the optional parameter is configured to specify any of whether the index entry should appear before, at, after, and as close as possible to the time to search;

combining the existing index with at least one of the plurality of other indexes into a combined index, the combined index comprising a plurality of indexes which are applied to the multimedia content in parallel, in series or in a combination of parallel and series, such that one index can adjust another index, the multimedia content being accessible in a user-customized manner using the combined index, wherein each of the plurality of indexes is configured to adjust the existing index such that inputs directed to the existing index are modified in real time to provide the multimedia content at a position determined to be most preferable to the user;

receiving user input indicating that at least a portion of the multimedia content is to be accessed using the combined index including at least a portion of the existing index and at least a portion of one or more of the plurality of indexes;

based on the received user input, determining a first multimedia content position using the existing index;

adjusting the first multimedia content position with a second multimedia content position determined by at least one of the plurality of indexes to be preferable to the first multimedia content position;

accessing the multimedia content at the second position using the combined index including at least the portion of the existing index and at least one of the get-index programming interface, the get-index-from-position programming interface, and the get-index-position programming interfaces; and displaying the indexed multimedia content on a display, wherein the multimedia content is navigable by a user using the plurality of indexes.

2. The computer program product as recited in claim 1, wherein the method further comprises an act of:
defining a get-count programming interface that retrieves a count of the number of indexes available for the multimedia content, the get-count programming interface comprising (i) a parameter to identify the count of the number of indexes available for the multimedia content, and (ii) a return value to indicate whether or not a particular call to the get-count programming interface succeeds.

3. The computer program product as recited in claim 1, wherein the method further comprises an act of:
defining a get-entry-from-position programming interface that retrieves an index entry based on a position of the index entry within an index, the get-entry-from-position programming interface comprises: (i) a parameter to identify the position of the index entry within the index, (ii) a parameter to identify a time that corresponds to the index entry, (iii) a parameter for data corresponding to the index entry, (iv) a parameter that specifies on input a data size available for data corresponding to the index entry, and on output specifies an actual data size for data corresponding to the index entry, and (v) a return value to indicate whether or not a particular call to the get-entry-from-position programming interface succeeds.

4. The computer program product as recited in claim 1, wherein:
the get-entry-from-time programming interface comprises: (i) a parameter to identify the time to search for the index entry within the multimedia content, (ii) a parameter to identify a position of the index entry within the index, (iii) a parameter for data corresponding to the index entry, (iv) a parameter that specifies on input a data size available for data corresponding to the index entry, and on output specifies an actual data size for data corresponding to the index entry, and (v) a return value to indicate whether or not a particular call to the get-entry-from-time programming interface succeeds.

5. The computer program product as recited in claim 1, wherein the method further comprises an act of:
defining a get-count programming interface that retrieves a count of index entries within an index, the get-count programming interface comprising (i) a parameter to identify the count of the index entries within the index, and (ii) a return value to indicate whether or not a particular call to the get-count programming interface that retrieves the count of index entries within an index succeeds.

6. The computer program product as recited in claim 1, wherein the method further comprises an act of:
defining a get-descriptor programming interface that retrieves a descriptor of an index, the get-descriptor programming interface comprising (i) a parameter to identify the descriptor of the index, (ii) a parameter to identify on input a data size available for the descriptor, and on output to identify an actual data size of the descriptor, and (iii) a return value to indicate whether or not a particular call to the get-descriptor programming interface succeeds.

7. The computer program product as recited in claim 1, further comprising an act of receiving user input defining a user-defined index which indicates one or more navigation points that are contrary to those indicated in the existing index.

8. The computer program product as recited in claim 7, wherein the user navigates to a first navigation point of the multimedia content using the existing index.

9. The computer program product as recited in claim 8, wherein the user navigates to a second navigation point of the multimedia content using at least one of the plurality of indexes.

10. At an end-user computer system capable of processing multimedia content, a method for interfacing with a plurality of code samples for navigating a portion of multimedia content including an existing index and one or more user-defined indexes, such that the user-defined indexes are capable of coexisting with and are concurrently accessible with the existing index and the other user-defined indexes, the method comprising acts of:
receiving user input defining a plurality of different programming interfaces, including:
user input defining a get-index programming interface that retrieves one of a plurality of indexes for the multimedia content, the plurality of indexes including a existing index corresponding to the multimedia content and at least one user-defined index, the get-index programming interface comprising at least three different parameters, including: (i) a parameter to identify the one index to retrieve, (ii) a parameter to identify the retrieved one index, and (iii) a return value to indicate whether or not a particular call to the get-index programming interface succeeds;
user input defining a get-index-from-position programming interface that retrieves one of the plurality of indexes corresponding to the multimedia content based on a position of the retrieved index within the plurality of available indexes, the get-index-from-position programming interface comprising at least three different parameters, including: (i) a parameter to identify the position of the one index to retrieve, (ii) a parameter to identify the retrieved one index, and (iii) a return value to indicate whether or not a particular call to the get-index-from-position programming interface succeeds;
user input defining a get-index-position programming interface that retrieves a position of one of the plurality of indexes within the plurality of indexes for the multimedia content, the get-index-position programming interface comprising at least three different parameters, including: (i) a parameter to identify the one index to retrieve, (ii) the position of the one index within the plurality of indexes, and (iii) a return value to indicate whether or not a particular call to the get-index-position programming interface succeeds; and
user input defining a get-entry-from-time programming interface that retrieves an index entry based on a time to search for the index entry within the multimedia content, wherein the get-entry-from-time programming interface includes an optional parameter to identify a search direction relative to the time to search, wherein the optional parameter is configured to specify any of whether the index entry should appear before, at, after, and as close as possible to the time to search;
combining the existing index with at least one of the plurality of other indexes into a combined index, the combined index comprising a plurality of indexes which are applied to the multimedia content in parallel, in series or in a combination of parallel and series, such that one index can adjust another index, the multimedia content being accessible in a user-customized manner using the combined index, wherein each of the plurality of indexes is configured to adjust the existing index such that inputs directed to the existing index are modified in real time to provide the multimedia content at a position determined to be most preferable to the user;

receiving user navigation input indicating that at least a portion of the multimedia content is to be accessed using the combined index including at least a portion of the existing index and at least a portion of the one or more of the plurality of indexes;

based on the received user input, determining a first multimedia content position using the existing index;

adjusting the first multimedia content position with a second multimedia content position determined by at least one of the plurality of indexes to be preferable to the first multimedia content position;

accessing the multimedia content at the second position using the combined index including at least the portion of the existing index and at least one of the get-index programming interface, the get-index-from-position programming interface, and the get-index-position programming interfaces to navigate to the portion indicated in the received user navigation input;

displaying the accessed multimedia content on a display according to the portion accessed as a result of the user input;

receiving user navigation input indicating that at least a portion of the multimedia content is to be accessed using one or more of the user-defined indexes;

accessing the multimedia content using at least one of the user-defined get-index programming interface, the user-defined get-index-from-position programming interface, and the user-defined get-index-position programming interfaces to navigate to the portion indicated in the received user navigation input;

displaying the accessed multimedia content on the display according to the portion accessed as a result of the user input.

11. At a computer system configured to process multimedia content, a method for interfacing with a plurality of code samples for interacting with an arbitrary index to the multimedia content such that the arbitrary index is capable of coexisting with one or more other arbitrary indexes, the method comprising acts of:

defining a get-index programming interface that retrieves one of a plurality of indexes for the multimedia content, the plurality of indexes including an existing index corresponding to the multimedia content and at least one other index, the get-index programming interface comprising (i) a parameter to identify the one index to retrieve, (ii) a parameter to identify the retrieved one index, and (iii) a return value to indicate whether or not a particular call to the get-index programming interface succeeds;

defining a get-index-from-position programming interface that retrieves one of the plurality of indexes corresponding to the multimedia content based on a position of the retrieved index within the plurality of available indexes, the get-index-from-position programming interface comprising (i) a parameter to identify the position of the one index to retrieve, (ii) a parameter to identify the retrieved one index, and (iii) a return value to indicate whether or not a particular call to the get-index-from-position programming interface succeeds;

defining a get-index-position programming interface that retrieves a position of one of the plurality of indexes within the plurality of indexes for the multimedia content, the get-index-position programming interface comprising (i) a parameter to identify the one index to retrieve, (ii) the position of the one index within the plurality of indexes, and (iii) a return value to indicate whether or not a particular call to the get-index-position programming interface succeeds;

defining a get-entry-from-position programming interface that retrieves an index entry based on a position of the index entry within an index;

defining a get-entry-from time programming interface that retrieves an index entry based on a time to search for the index entry within the multimedia content, wherein the get-entry-from-time programming interface includes a parameter to identify a search direction relative to the time to search, wherein the parameter is configured to specify any of whether the index entry should appear before, at, after, and as close as possible to the time to search;

combining the existing index with at least one of the plurality of other indexes into a combined index, the combined index comprising a plurality of indexes which are applied to the multimedia content in parallel, in series or in a combination of parallel and series, such that one index can adjust another index, the multimedia content being accessible in a user-customized manner using the combined index, wherein each of the plurality of indexes is configured to adjust the existing index such that inputs directed to the existing index are modified in real time to provide the multimedia content at a position determined to be most preferable to the user;

receiving user input indicating that at least a portion of the multimedia content is to be accessed using the combined index including at least a portion of the existing index and at least a portion of one or more of the plurality of indexes;

based on the received user input, determining a first multimedia content position using the existing index;

adjusting the first multimedia content position with a second multimedia content position determined by at least one of the plurality of indexes to be preferable to the first multimedia content position;

accessing the multimedia content at the second position using the combined index including at least the portion of the existing index and at least one of the get-index programming interface, the get-index-from-position programming interface, and the get-index-position programming interfaces; and displaying the indexed multimedia content in two different content portion orderings on two different displays for the at least two different users, wherein the multimedia content is separately navigable by each user using the combined index.

12. The method of claim 1, wherein the existing, combined and plurality of other indexes are applied in real-time.

13. The method of claim 1, further comprising applying the combined index to at least two different data streams of the multimedia content.

14. The method of claim 1, further comprising applying both the existing index and at least one of the plurality of other indexes to each multimedia stream in the multimedia content.

15. The method of claim 13, wherein the at least two different streams comprise video and audio streams.

16. The method of claim 1, wherein the plurality of indexes is hierarchical, such that at least one of the plurality references at least one other previously generated index.

* * * * *

UNITED STATES PATENT AND TRADEMARK OFFICE
CERTIFICATE OF CORRECTION

PATENT NO. : 7,984,089 B2  
APPLICATION NO. : 10/778769  
DATED : July 19, 2011  
INVENTOR(S) : Matthijs A. Gates et al.

It is certified that error appears in the above-identified patent and that said Letters Patent is hereby corrected as shown below:

In column 12, line 52, after "show" insert -- bi-directional flow and interfaces on each side of the flow, certain implementations may only --.

Signed and Sealed this
Twentieth Day of September, 2011

David J. Kappos
*Director of the United States Patent and Trademark Office*